June 28, 1966  J. B. GODSHALK ETAL  3,258,672
BATTERY CHARGERS
Filed Dec. 16, 1960
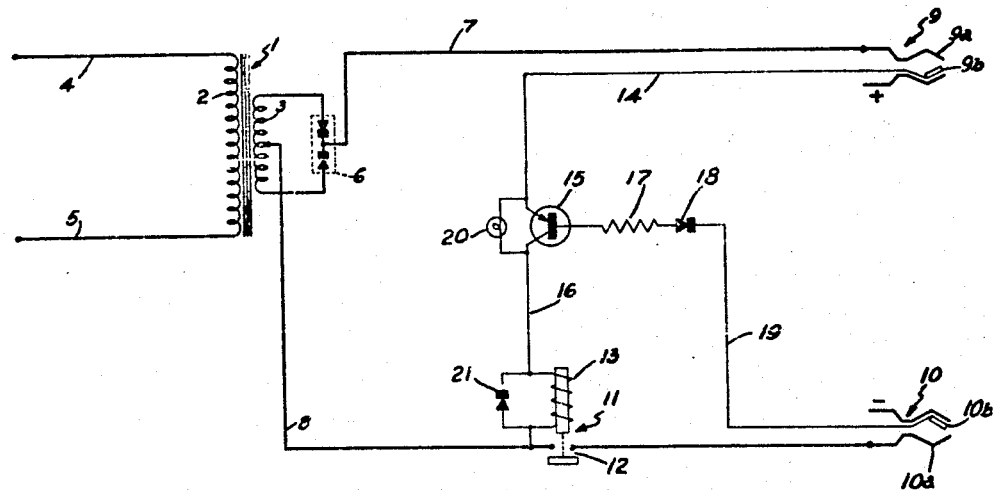
INVENTORS
JAMES B. GODSHALK
LEWIS A. MEDLAR
GEORGE W. PURNELL
BY *Arnold & Roylance*
ATTORNEYS

United States Patent Office 3,258,672
Patented June 28, 1966

3,258,672
BATTERY CHARGERS
James B. Godshalk, Chester Springs, Lewis A. Medlar, Oreland, and George W. Parnell, Willow Grove, Pa., assignors to Fox Products Company, Philadelphia, Pa., a corporation of Pennsylvania
Filed Dec. 16, 1960, Ser. No. 76,382
7 Claims. (Cl. 320—25)

This invention relates to battery chargers and more particularly to an improved battery charger incorporating novel means for preventing charging in the event the charger is connected to the battery with a polarity opposite to that required for proper charging.

Battery chargers, and particularly those employed in garages and service stations to charge automotive storage batteries, are usually operated by persons having relatively little technical skill. It is accordingly necessary to so construct the battery charger as to guard against improper operation thereof. A particular problem arises because, unless the operator is reasonably skilled, it frequently happens that the battery or batteries to be charged are connected with reverse polarity, that is, with the polarity of the battery being such that the battery aids, rather than opposes, the charging voltage. Connection of the battery to the charger in reverse can, and in actual practice frequently does, cause severe damage. Thus, the large amount of D.C. power in the battery can burn out the rectifier and transformer and melt the leads of the charger, so that the charger is totally ruined, and may damage the battery terminals beyond repair. Further, assuming that the battery has been in use recently, arcing, which occurs at the battery terminals during connection of the battery to the charger in reverse, can cause explosions by igniting gases in the cells of the battery. If the cell caps are in place when the explosion occurs, the force of the explosion may shatter the battery, damaging it beyond repair and possibly injuring the operator of the charger.

Prior art workers have devised many types of systems for guarding against connecting the battery in reverse polarity. In particular, it has heretofore been proposed to employ relay systems constructed and arranged to automatically correct the polarity of the battery when the same has been connected improperly. Unfortunately, such automatic polarity correcting systems have been quite expensive and, while highly successful, frequently cannot be incorporated in a particular line of battery chargers because of economical considerations.

As disclosed in copending application Serial No. 63,343, filed October 18, 1960, by James B. Godshalk and Lewis A. Medlar, it has also been proposed to solve the problem of reverse polarity connection by employing a special relay, and control circuit therefor, to prevent completion of the charging circuit unless the same has been connected to a battery with proper polarity for charging. While devices of that type have proved successful, and are advantageous from the standpoint of cost, they involve the distinct disadvantage of requiring a moving contact relay which is subject to failure during use of the charger.

It is accordingly a general object of the invention to devise a battery charger embodying improved, dependable means for preventing operation of the charger when a battery has been connected thereto with reverse polarity.

Another object is to provide, in a battery charger, means preventing the charger from being operated when a battery has been connected with reverse polarity, which means employs an electromagnetic contactor but no additional relays or other switching devices having moving contacts.

A further object is to provide, in a battery charger having an electromagnetic contactor which must close before charging can proceed, dependable and economical control means operative to accomplish closing of the contactor whenever the charging source is activated with no battery connected thereto or with a battery connected thereto with proper polarity, and to prevent closing of the contactor when a battery is connected to the charger with reverse polarity.

In order that the manner in which these and other objects are attained, in accordance with the invention, can be understood in detail, reference is had to the accompanying drawing, which forms a part of this specification, and wherein:

The single figure is a schematic diagram of a battery charger constructed in accordance with one embodiment of the invention.

Turning now to the drawing in detail, it will be seen that the battery charger here illustrated comprises a transformer 1 having a primary winding 2 and a center tapped secondary winding 3, the primary winding being connectable to a suitable A.C. source (not shown) in the usual fashion via conductors 4 and 5. A center tapped rectifier 6 is connected across the full secondary winding 3, the center tap of the rectifier being connected to one charging lead 7. The other charging lead 8 is connected to the center tap of secondary winding 3.

Leads 7 and 8 are connected respectively to connector clamps 9 and 10 adapted for connection to the terminals of the battery to be charged. Shown diagrammatically here, clamps 9 and 10 are of the pivoted jaw type and are advantageously constructed in the manner described in detail in aforementioned copending application Serial No. 63,343. Thus, clamp 9 includes a conductive jaw member 9a, to which lead 7 is connected, and a second conductive member 9b which is carried by the other jaw member of the clamp in such fashion as to engage the battery terminal but which is electrically insulated from jaw member 9a. Clamp 10 similarly comprises a conductive jaw member 10a, to which lead 8 is connected, and a second conductive member 10b arranged to engage the battery terminal but insulated electrically from member 10a.

A solenoid contactor 11 is employed, the normally open contacts 12 thereof being connected in lead 8. The actuating winding 13 of contactor 11 is connected between leads 7 and 8, via the battery terminal to which clamp 9 is connected. Thus, one terminal of winding 13 is connected to lead 8 between contacts 12 and the center tap of secondary winding 3. The other terminal of winding 13 is connected to conductive member 9b of clamp 9, and hence to the battery terminal to which clamp 9 is connected, via conductor 14, the emitter and collector of a PNP type, high current (2 amps or more) transistor 15, and conductor 16. Accordingly, since the emitter and collector of transistor 15 are in series between winding 13 and conductive member 9b, winding 13 can be energized, by current from the rectifier 6, to close contacts 12 only if clamp 9 is connected to a terminal of a battery and transistor 15 is conductive.

The base of transistor 15 is connected to conductive member 10b of clamp 10 via a current limiting resistance 17, a silicon diode 18 and conductor 19, diode 18 being poled to oppose current flow when clamps 9 and 10 are connected to a battery with reverse polarity but to allow current flow when the clamps are connected to a battery with proper polarity for charging.

As indicated, clamp 9 is to be connected to the positive terminal of the battery and clamp 10 to the negative terminal. When the clamps are both properly connected to a battery to be charged, the base of transistor 15 is maintained at a potential sufficiently less positive than is the emitter (by reason of connection of the base to conductive clamp member 10b via resistance 17 and diode 18) to render the transistor conductive. Accordingly, current can flow from rectifier 6 via lead 7, clamp 9 and the terminal to which it is connected, conductor 14, the emitter-to-collector circuit of the transistor, conductor 16, winding 13 of the contactor, and lead 8. The contactor is thus energized from the charging current source, contacts 12 are closed, and charging can proceed. It will be understood that only a small negative potential need be established at the base of the transistor, with respect to the emitter, in order to make the transistor conductive. Hence, the transistor will be conductive, and the contactor energized to allow charging, even if the charger is connected to a substantially "flat" battery, so long as the connection is made with the proper polarity for charging.

Should clamps 9 and 10 be connected to a battery with the polarity opposite to that required for charging, the base of transistor 15 will be more positive than the emitter, so that the transistor is rendered non-conductive. Hence, current from the rectifier cannot energize winding 13 of the contactor, and charging cannot proceed.

In order that the operator can observe that the battery has been connected with reverse polarity, a pilot lamp 20 is connected across the emitter-collector of the transistor. So long as clamp 9 is connected to a battery terminal and transistor 15 is non-conductive, lamp 20 is energized by current from the rectifier, but the resistance of the lamp is such that winding 13 will not be energized.

Since the emitter-base junction of transistor 15 constitutes a diode poled to oppose current flow when clamps 9, 10 are connected to a battery with reverse polarity, the transistor alone, without additional diode 18, is operative to assure that the contactor will not close when the connection to the battery is of the wrong polarity. However, the emitter-base breakdown voltage for normally available transistors is fairly low and, even for a 6-volt automotive storage battery, as much as 6 or 7 volts could be applied in the inverse direction to the emitter-base junction in the event of reverse polarity connection. Diode 18 is accordingly employed to limit the inverse voltage at the emitter-base junction to a safe range.

When winding 13 of the contactor is de-energized, the collapse of the field produced by the winding can generate a substantial voltage which, if applied to the series-connected transistor, would tend to damage the transistor. To avoid this, a silicon diode 21 is connected across the winding of the contactor, the diode being poled to conduct current tending to flow as a result of collapse of the field of the winding but to oppose current flowing from the rectifier to energize the winding. Such connection of the diode 21 provides a closed circuit in which current can be dissipated, without damage to the transistor, when the winding 13 is de-energized.

While advantageous embodiments have been chosen for illustrative purposes, it will be obvious to those skilled in the art that various changes and modifications can be made without departing from the scope of the present invention as defined in the appended claims.

What is claimed is:

1. In a battery charger, the combination of
   a charging circuit including
      a pair of charging leads each provided with a connector for connection to a terminal of the battery to be charged;
   a contactor comprising
      contacts connected in said charging circuit to selectively interrupt and complete the same, and
      an actuating winding for actuating said contacts when energized;
   a transistor;
   first circuit means connected to said charging circuit to receive current therefrom and including said transistor and said winding interconnected for energization of said winding by current from said charging circuit when said transistor is in a predetermined operative state; and
   second circuit means operatively connected to at least one of said connectors and to said transistor to control the operative state of said transistor in accordance with the polarity of the battery potential at said connectors.

2. The apparatus in accordance with claim 1 wherein said transistor has an emitter, a collector and a base,
   said emitter and said base being connected in said second circuit means such that current flow through the emitter-base circuit of said transistor is determined by the polarity and magnitude of the battery potential at said connectors to control the operative state of said transistor accordingly, and
   said emitter and collector being connected in said first circuit means such that current flow from said charging circuit through the emitter-collector circuit of said transistor for energizing said winding is in accordance with the operative state of said transistor.

3. The apparatus in accordance with claim 1 wherein said transistor has an emitter, a collector and a base,
   said base being connected in said second circuit means so that the operative state of said transistor is determined in accordance with the polarity of the battery potential at said connectors, and
   said emitter and collector being connected in said first circuit means such that current flow from said charging circuit through the emitter-collector circuit of said transistor for energizing said winding is in accordance with the operative state of said transistor.

4. In a battery charger, the combination of
   a charging circuit including
      a transformer and rectifying means interconnected to provide charging current, and
      first and second charging leads each connected at one end to said transformer and rectifying means and provided at the other end with a connector for connection to a battery being charged;
   a contactor comprising
      contacts connected in said first charging lead and actuatable to complete said first charging lead, and
      an actuating winding for actuating said contacts when energized;
   a transistor;
   first circuit means
      connected between said second charging lead and said first charging lead at a point between said contacts and said transformer and rectifying means, and
      including said transistor and said winding so interconnected that current flow through said winding from said transformer and rectifying means is in accordance with the operative state of said transistor;
   second circuit means
      connected between said second charging lead and said first charging lead at a point between said contacts and the connector to which said first charging lead is connected, and
      including said transistor so connected that the operative state of said transistor is controlled in accordance with the polarity of the battery potential appearing between said connectors when connected to a battery.

5. In a polarity responsive circuit for selectively completing a battery servicing circuit between a battery servicing device and a battery being serviced only when the battery is connected with a polarity proper for servicing, the combination of first and second leads each connectable between the servicing device and the battery being serviced;
a contactor having
contacts connected in said first lead to complete said first lead when actuated, and
an actuating winding for actuating said contacts when energized;
a semiconductor device;
first circuit means including
a source of potential,
said winding, and
said semiconductor device
so interconnected that said winding is energized by current flow from said source through said semiconductor device when conductive; and
second circuit means
connected between said second lead and said first lead at a point between said contacts and the end thereof connectable to the battery, and
including said semiconductor device so connected that the conductive state thereof is controlled in accordance with the polarity of a battery connected to said first and second leads.

6. The apparatus in accordance with claim 5 wherein said semiconductor device is a transistor having
an emitter,
a collector, and
a base,
and wherein
said emitter and said collector are connected in said first circuit such that said winding is energized by current flow from said source through the emitter-collector circuit of said transistor when in the conductive state, and
said emitter and said base are connected in said second circuit means such that current flow from the battery, when connected through the emitter-base circuit of said transistor controls the operative state of said transistor.

7. In a battery charger, the combination of a charging circuit including
means interconnected to provide charging current, and
first and second charging leads each connected at one end to said means and provided at the other end with a connector for connection to a battery being charged;
a contactor comprising
contacts connected in said first charging lead and actuatable to complete said first charging lead, and
an actuating winding for actuating said contacts when energized;
a transistor;
first circuit means
connected between said second charging lead and said first charging lead at a point between said contacts and said means, and including said transistor and said winding so interconnected that current flow through said winding from said means is in accordance with the operative state of said transistor;
second circuit means
connected between said second charging lead and said first charging lead at a point between said contacts and the connector to which said first charging lead is connected, and
including said transistor so connected that the operative state of said transistor is controlled in accordance with the polarity of the battery potential appearing between said connectors when connected to a battery.

References Cited by the Examiner
UNITED STATES PATENTS
2,766,418  10/1956  Rice _____ 320—25
2,885,623  5/1959  Staufenberg.

OTHER REFERENCES
"Basic Theory and Application of Transistors," U.S. Army Technical Manual 11–690, March 1959 (pages 98, 100, and 191 relied on).

LLOYD, McCOLLUM, *Primary Examiner.*
G. H. GERSTMAN, S. WEINBERG,
*Assistant Examiners.*